United States Patent
Stahl et al.

(10) Patent No.: US 7,540,897 B2
(45) Date of Patent: Jun. 2, 2009

(54) SYSTEM FOR A PLATE-SHAPED FILTER ELEMENT IN A GAS FILTER HOUSING

(75) Inventors: Ulrich Stahl, Laudenback (DE); Joern-Uwe Krueger, Morsbach (DE); Uwe Felber, Absteinbach (DE)

(73) Assignee: Carl Freudenberg KG, Weinheim (DE)

( * ) Notice: Subject to any disclaimer, the term of this patent is extended or adjusted under 35 U.S.C. 154(b) by 463 days.

(21) Appl. No.: 11/234,948

(22) Filed: Sep. 26, 2005

(65) Prior Publication Data

US 2006/0090433 A1    May 4, 2006

(30) Foreign Application Priority Data

Sep. 27, 2004   (DE) ................. 10 2004 047 126
Nov. 9, 2004    (DE) ................. 10 2004 054 246

(51) Int. Cl.
*B01D 46/42*    (2006.01)
*B01D 46/52*    (2006.01)

(52) U.S. Cl. ............... 55/497; 55/500; 55/502; 55/511; 55/521; 264/251; 264/254; 156/73.1

(58) Field of Classification Search ........... 55/497, 55/500, 502, 511, 521, DIG. 5; 264/251, 264/254; 156/73.1
See application file for complete search history.

(56) References Cited

U.S. PATENT DOCUMENTS

| 5,720,790 A | * | 2/1998 | Kometani et al. ........... 55/497 |
| 5,902,361 A | * | 5/1999 | Pomplun et al. ........... 55/385.3 |
| 5,958,097 A | * | 9/1999 | Schlor et al. ........... 55/497 |
| 6,033,455 A | * | 3/2000 | Kurashima ........... 55/497 |
| 6,045,598 A | * | 4/2000 | Fath et al. ........... 55/490 |
| 6,162,272 A | * | 12/2000 | Michaelis et al. ........... 55/497 |
| 6,267,796 B1 | * | 7/2001 | Schottmer ........... 55/502 |
| 6,379,438 B1 | * | 4/2002 | Schneider et al. ........... 96/154 |
| 6,454,826 B2 | * | 9/2002 | Fath et al. ........... 55/490 |
| 6,508,851 B2 | * | 1/2003 | Goerg ........... 55/385.3 |
| 2002/0020156 A1 | | 2/2002 | Goerg ........... 55/385.3 |

FOREIGN PATENT DOCUMENTS

| DE | 195 32 436 | 1/1997 |
| DE | 101 31 422 | 1/2003 |
| EP | 0 490 169 | 6/1992 |
| EP | 0 692 294 | 9/1998 |

* cited by examiner

*Primary Examiner*—Duane Smith
*Assistant Examiner*—Minh-Chau T Pham
(74) *Attorney, Agent, or Firm*—Davidson, Davidson & Kappel, LLC

(57) ABSTRACT

A system is disclosed for a plate-shaped filter element (2) in a gas filter housing (1). The filter element (2) has filter material (3), which is folded in a zigzag shape, having filter folds closed at the front edges, and the closure (4) being made of essentially the same filter material which forms the filter folds, and having an edge area (5) projecting outward on both sides, and in which the two edge areas (5) are inserted into the housing (1) having insert struts (7), on the sides assigned to the end folds of he plate-shaped filter element (2), which engage the end folds (8) and ensure a leakage air rate of 0 to 4 m$^3$/h at a differential pressure of at least 200 Pa.

5 Claims, 2 Drawing Sheets

US 7,540,897 B2

SYSTEM FOR A PLATE-SHAPED FILTER ELEMENT IN A GAS FILTER HOUSING

This claims the benefit of German Patent Application Nos. 10 2004 047 126.6 and 10 2004 054 246.5, both of which are hereby incorporated by reference herein.

BACKGROUND

The present invention relates to a system for a plate-shaped filter element in a gas filter housing, the filter element including filter material folded in a zigzag shape having filter folds closed at the front edges, and the closure being made essentially from the same material which forms the filter folds, and having an edge area projecting outward on both sides.

A plate-shaped filter insert for gas filters, which includes web material folded in a zigzag shape having filter folds closed at the front edges, is known from EP 0 490 169 B2. This filter insert has frame parts which are glued or welded onto the fold backs on the lateral areas of the filter insert formed by the fold front edges and project beyond the plate-shaped filter insert on all four sides so that this projecting area may be clamped tightly in the housing of a gas filter. The frame and the filter web may be made of an identical material or at least a material which has a similar composition. It has been shown to be disadvantageous in this case that either a prefinished strip-shaped frame or individual prefinished strip-shaped frame parts, which may be assembled into a frame, are to be attached to the web material folded in a zigzag shape.

A filter insert and a method for its manufacture, in which a folded pack made of a thermoplastic weldable nonwoven material is bonded along at least its two external sides to at least one seal in each case, is known from the document DE 195 32 436 C1. The seal, which is made of a thermoplastic weldable material, may be engaged with a filter housing enclosing the filter insert to form a seal. This is performed in that the sealing strips have a cross section folded in a V-shape, of which the first leg is bonded to the folded pack to form a seal and the second leg presses against the filter housing to form a seal due to its elastic pre-tension. Such a system, which is used in automobile internal filters, does not achieve the low leakage air rates required for the field of engine intake air area, which are lower than the required leakage air rate for automobile internal filters by a factor of three.

SUMMARY OF THE INVENTION

The present invention has an object of specifying a system for a plate-shaped filter element in a gas filter housing which ensures a leakage air rate of <5 m$^3$/h at a differential pressure of at least 200 Pa. Furthermore, the present invention has an alternate or additional object of specifying a filter element for use in the system according to the present invention.

The present invention provides a system for a plate-shaped filter element in a gas filter housing, the filter element comprising filter material, which is folded in a zigzag shape, having filter folds closed at the front edges, and the closure being made of essentially the same filter material which forms the filter folds, and having an edge area projecting outward on both sides. The two edge areas of the filter element made of filter material folded in a zigzag shape, which is closed at the front edges, are inserted into the housing of a filter to form a seal in order to isolate a downstream clean chamber and in which the housing has insert struts on the sides assigned to the end folds of the plate-shaped filter element, which engage the end folds and ensure a leakage air rate of 0-4 m$^3$/h at a differential pressure of at least 200 Pa.

Surprisingly, the suggested system renders it possible to use a filter element for interior ventilation, which is known per se, for engine intake air filtration. The seal according to the present invention at the front sides of the filter element via the engagement of insert tabs in the end folds of the plate filter element ensures the required leakage air rate of <5 m$^3$/h at a differential pressure of at least 200 Pa.

In the system according to the present invention, a filter element made of a filter material which has different porosities in regard to its two main sides and is positioned so that the more open-pored side points toward the face side is preferably used. The corresponding system ensures the build up of a porous filter cake layer and therefore a high filter performance even in the event of large dust loads.

A filter element for use in the system according to the present invention is, according to the present invention, one in which the material used as the closure of the front edges is made of the same material as the filter material folded in a zigzag shape. The material used for the closure of the front edges and for the lateral sealing therefore ensures the same filter performance as the filter material making up the main area of the filter element.

A filter element in which the filter material employed is made of filter material compacted on one side by high-pressure fluid jets is especially preferred for use in the system according to the present invention. This material has different porosities in regard to its two main sides and ensures a long service life of the filter element.

A filter element in which the material used for the closure of the front edges is attached to the side compacted by high-pressure fluid jets at the front edges of the filter edges and in which the edge areas projecting outward on both sides extend approximately to the height of the plane spanned by the fold backs, which is formed by the side of the filter material compacted by high-pressure fluid jets, is especially preferred for use in a system according to the present invention. Therefore, the same filter action is achieved at all points of the filter in regard to the filter material.

BRIEF DESCRIPTION OF THE DRAWINGS

The present invention is explained in greater detail in the following on the basis of two figures.

DETAILED DESCRIPTION

Figure 1:
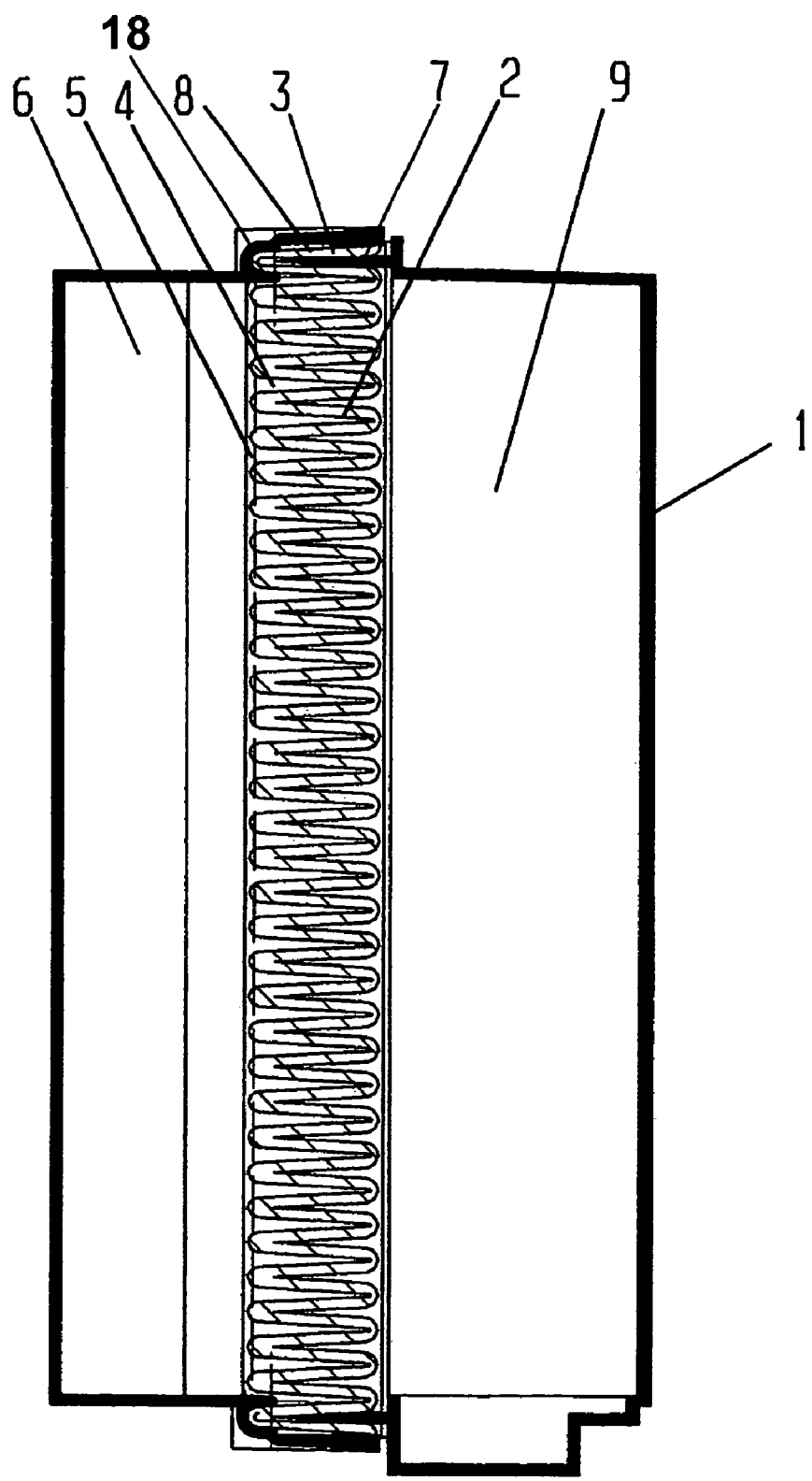
FIG. 1 shows a longitudinal section of an embodiment of a system according to the present invention in the fold direction of the filter material folded in a zigzag shape.

FIG. 1 shows plate-shaped filter element 2 positioned in a housing 1. Filter element 2 is made of a filter material 3 folded in a zigzag shape and is provided at the front edges with a closure 4 made of an essentially identical filter material. This closure 4 has outwardly projecting edge areas 5, which are inserted into housing 1 to form a seal in order to isolate downstream clean chamber 6. Housing 1 has insert struts 7 on the sides assigned to end folds 8 of plate-shaped filter element 2, which engage end folds 8 of plate-shaped filter element 2. By working together with a corresponding receiver 18, a leakage air rate of 0 to 4 m$^3$/h is achieved at a differential pressure of 200 Pa.

Figure 2:
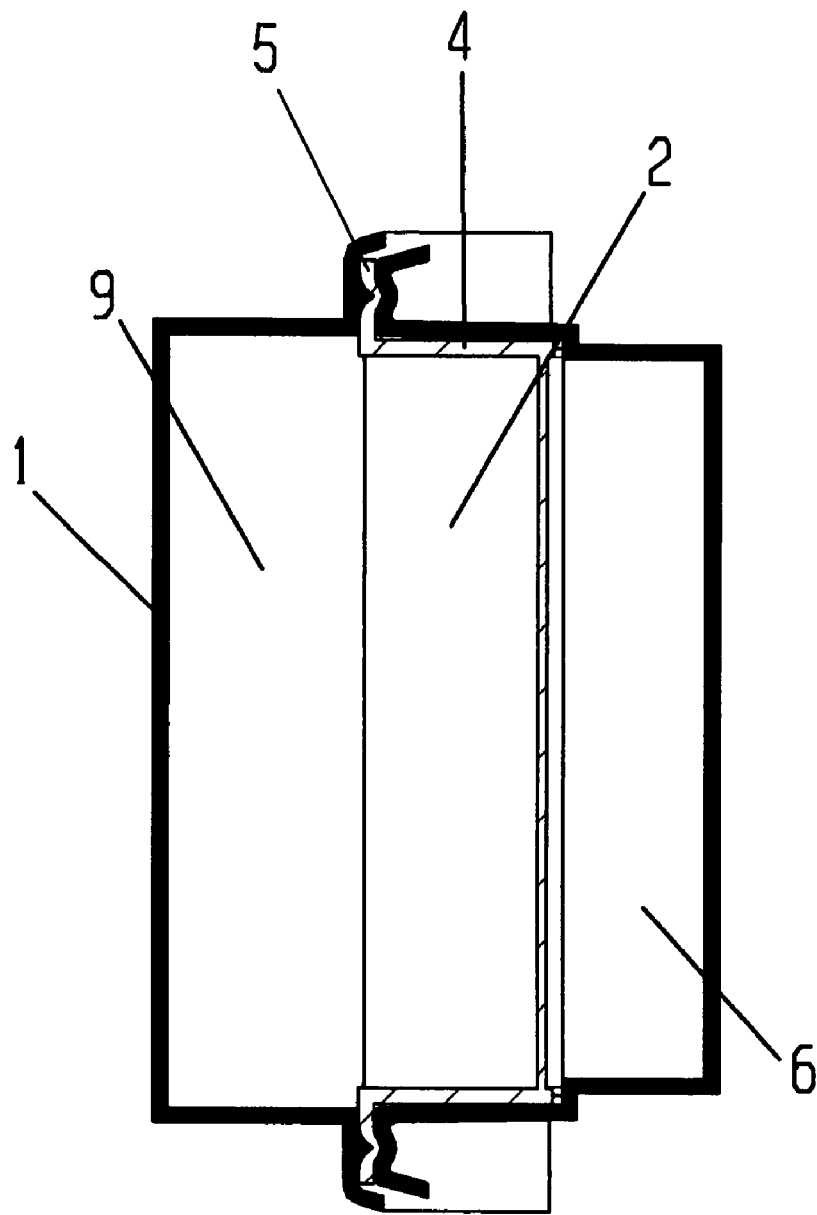
FIG. 2 shows a section of the embodiment of the system according to the present invention transverse to the fold direction of the filter material folded in a zigzag shape.

FIG. 2 shows a section of a system according to the present invention transverse to the fold direction of filter element 2, which includes filter material 3 folded in a zigzag shape.

Closure 4 of the front edges of filter material 3 folded in a zigzag shape has outwardly projecting edge areas 5, which are inserted into formfitting edge areas of housing 1 to form a seal in order to isolate downstream clean chamber 6 from face side 9.

What is claimed is:

1. A system for a plate-shaped filter element in a gas filter housing comprising:

a gas filter housing; and a filter element having filter material folded in a zigzag shape, having filter folds closed at the front edges to define a closure, the filter folds having interior folds and end folds, the closure being made of the same filter material forming the filter folds, and having edge areas projecting outward on both sides so as to define two edge areas, the two edge areas being inserted into the gas filter housing to form a seal in order to isolate a downstream clean chamber, the housing having insert struts on sides assigned to the end folds of the filter element and engaging the end folds to ensure a leakage air rate of 0 to 4 $m^3/h$ at a differential pressure of at least 200 Pa, the end folds being of a similar size as the interior folds and the insert struts being located within the end folds.

2. The system as recited in claim 1 wherein the filter element has two main sides and is made of a filter material having different porosities in regard to the two main sides and is positioned so that a more open-pored side of the two sides points toward a face side opposite the downstream clean chamber.

3. A filter system comprising:

a gas filter housing having insert struts on sides assigned to end folds of the filter element and engaging the end folds to ensure a leakage air rate of 0 to 4 $m^3/h$ at a differential pressure of at least 200 Pa; and a filter element having filter material made of filter material compacted on one side by high-pressure fluid jets folded in a zigzag shape, having filter folds closed at the front edges to define a closure, the closure being made of the same filter material forming the filter folds, and having edge areas projecting outward on both sides so as to define two edge areas, the two edge areas when inserted into the gas filter housing capable of forming a seal in order to isolate a downstream clean chamber.

4. The filter element as recited in claim 3 wherein the material for the closure of the front edges is attached to a side compacted by high-pressure fluid jets at the front edges of the filter folds and the edge areas projecting outward on both sides extend approximately to the height of a plane spanned by backs of the filter folds, the backs being formed by the side of the filter material compacted by high-pressure fluid jets.

5. A system for a plate-shaped filter element in a gas filter housing comprising:

a gas filter housing; and a filter element having filter material folded in a zigzag shape, having filter folds closed at the front edges to define a closure, the closure being made of the same filter material forming the filter folds, and having edge areas projecting outward on both sides so as to define two edge areas, the two edge areas being inserted into the gas filter housing to form a seal in order to isolate a downstream clean chamber, the housing having insert struts on sides assigned to end folds of the filter element and engaging the end folds to ensure a leakage air rate of 0 to 4 $m^3/h$ at a differential pressure of at least 200 Pa;

wherein the filter element has two main sides and is made of a filter material having different porosities in regard to the two main sides and is positioned so that a more open-pored side of the two sides points toward a face side opposite the downstream clean chamber.

\* \* \* \* \*